(12) United States Patent
La Fratta et al.

(10) Patent No.: US 11,543,978 B2
(45) Date of Patent: Jan. 3, 2023

(54) CREDIT-BASED SCHEDULING OF MEMORY COMMANDS

(71) Applicant: Micron Technology, Inc., Boise, ID (US)

(72) Inventors: Patrick A. La Fratta, McKinney, TX (US); Robert M. Walker, Raleigh, NC (US)

(73) Assignee: MICRON TECHNOLOGY, INC., Boise, ID (US)

(*) Notice: Subject to any disclaimer, the term of this patent is extended or adjusted under 35 U.S.C. 154(b) by 197 days.

(21) Appl. No.: 16/929,003

(22) Filed: Jul. 14, 2020

(65) Prior Publication Data

US 2022/0019360 A1  Jan. 20, 2022

(51) Int. Cl.
G06F 13/16 (2006.01)
G06F 3/06 (2006.01)

(52) U.S. Cl.
CPC ........... G06F 3/0631 (2013.01); G06F 3/067 (2013.01); G06F 3/0613 (2013.01); G06F 3/0659 (2013.01)

(58) Field of Classification Search
CPC .... G06F 3/0613; G06F 3/0631; G06F 3/0632; G06F 3/0659; G06F 3/067; G06F 3/0679; G06F 3/0683; G06F 3/0688; G06F 13/1642; G06F 13/1652; G06F 13/1657; G06F 13/18; G06F 13/26; G06F 13/30; G06F 13/34

USPC ..... 370/395.4–395.43; 710/5–7, 39–45, 112, 710/116–117, 74; 711/151, 158; 718/102–104

See application file for complete search history.

(56) References Cited

U.S. PATENT DOCUMENTS

| | | | |
|---|---|---|---|
| 10,437,758 B1* | 10/2019 | Mathews | G06F 13/18 |
| 2003/0223430 A1* | 12/2003 | Lodha | H04L 47/525 370/395.41 |
| 2018/0189522 A1* | 7/2018 | Kwasnick | H04L 29/08099 |
| 2021/0191650 A1* | 6/2021 | Vansteenkiste | H04L 47/215 |

* cited by examiner

*Primary Examiner* — Ilwoo Park
(74) *Attorney, Agent, or Firm* — Nicholson De Vos Webster & Elliot LLP

(57) ABSTRACT

A method is described that includes receiving a plurality of streams of memory requests and each stream is associated with a source. The method further includes determining a bandwidth allocation for each stream, wherein each allocation represents a portion of a total bandwidth of a memory component managed by the subsystem and each allocation indicates a priority of a corresponding stream based on a corresponding source of each stream and assigning a set of credits to each stream based on the bandwidth allocations. The method also includes determining a memory command from a queue for issuance, wherein each memory command in the queue is associated with a stream and determining the memory command is based on the credits assigned to each stream such that commands associated with a stream with a higher number of credits is given priority for issuance over commands associated with a stream with a lower number.

20 Claims, 10 Drawing Sheets

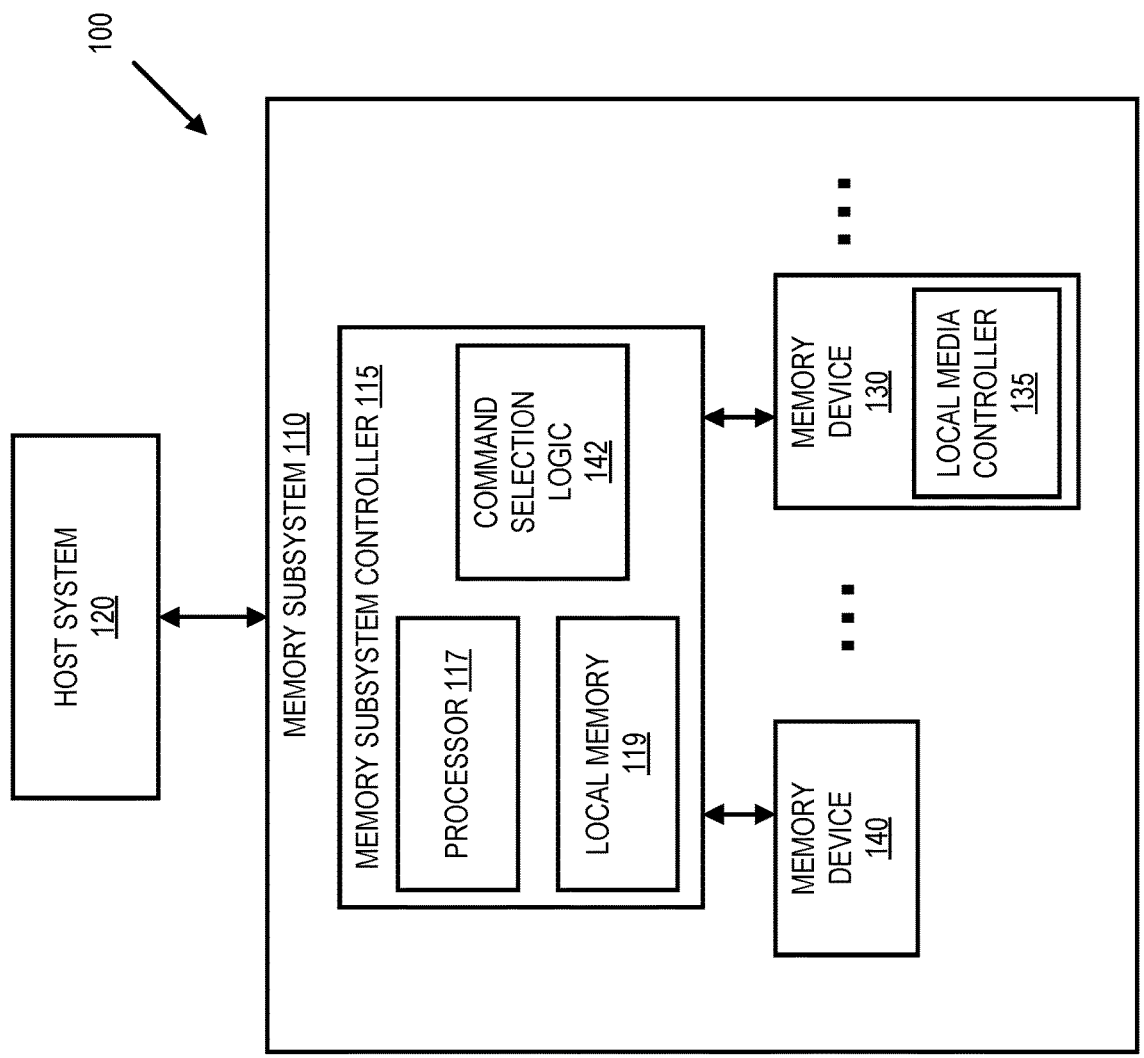

| BANDWIDTH ALLOCATION TABLE 300 ||
|---|---|
| STREAM IDENTIFIER 302 | BANDWIDTH ALLOCATION 304 |
| 0 | 50% |
| 1 | 10% |
| 2 | 35% |
| 3 | 5% |

FIG. 3

| CREDIT TABLE 400 | |
|---|---|
| STREAM IDENTIFIER 302 | CREDITS 402 |
| 0 | 5 |
| 1 | 1 |
| 2 | 3 |
| 3 | 1 |

FIG. 4

| PRIORITY ORDER TABLE 500 | |
|---|---|
| STREAM IDENTIFIER 302 | CREDITS 402 |
| 0 | 5 |
| 2 | 3 |
| 1 | 1 |
| 3 | 1 |

FIG. 5

| COMMAND QUEUE 600 | |
|---|---|
| MEMORY COMMAND 602 | STREAM IDENTIFIER 302 |
| MEMORY COMMAND 0 | 0 |
| MEMORY COMMAND 1 | 1 |
| MEMORY COMMAND 2 | 2 |
| MEMORY COMMAND 3 | 0 |

FIG. 6

CREDIT-BASED SCHEDULING OF MEMORY COMMANDS

TECHNICAL FIELD

The present disclosure generally relates to scheduling of memory commands, and more specifically, relates to credit-based scheduling of memory commands.

BACKGROUND ART

A memory subsystem can include one or more memory devices that store data. The memory devices can be, for example, non-volatile memory devices and volatile memory devices. In general, a host system can utilize a memory subsystem to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing environment that includes a memory subsystem, in accordance with some embodiments of the present disclosure.

FIG. 3 shows bandwidth allocations assigned to each stream/stream identifier, in accordance with some embodiments of the present disclosure.

FIG. 4 shows credits assigned to each stream/stream identifier based on the bandwidth allocations, in accordance with some embodiments of the present disclosure.

FIG. 5 shows stream/stream identifiers sorted in a priority order table based on the credits assigned to each stream/stream identifier, in accordance with some embodiments of the present disclosure.

FIG. 6 shows a memory queue that stores pending memory commands associated with different streams/stream identifiers, in accordance with some embodiments of the present disclosure.

DETAILED DESCRIPTION

Figure 2A:
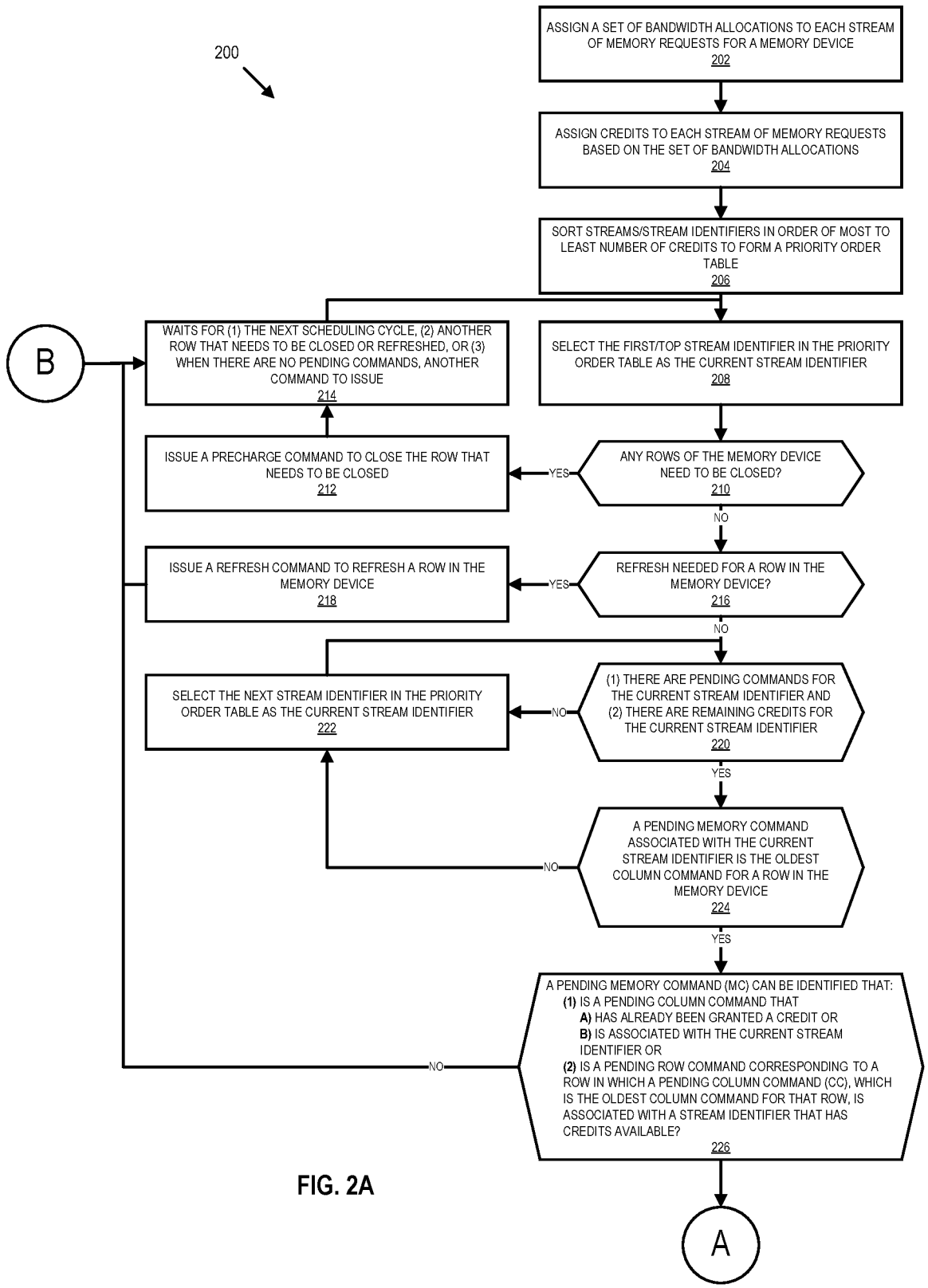
FIGS. 2A and 2B show a flow diagram of an example method to schedule issuance of memory commands based on credits assigned to streams of memory requests, in accordance with some embodiments of the present disclosure.

Aspects of the present disclosure are directed to a credit-based approach to scheduling memory commands for issuance in a memory subsystem. An example of a memory subsystem is a memory module that is connected to a central processing unit (CPU) via a memory bus. A memory subsystem can be a storage device, a memory module, or a hybrid of a storage device and memory module. Examples of storage devices and memory modules are described below in conjunction with FIG. 1. In general, a host system can utilize a memory subsystem that includes one or more memory devices. The memory devices can include, for example, non-volatile memory devices (e.g., NAND). Other types of memory devices, including volatile memory devices, are described in greater detail below in conjunction with FIG. 1. The host system can provide data to be stored at the memory subsystem and can request data to be retrieved from the memory subsystem.

A memory subsystem has an upper bound on the amount of data that corresponding memory devices can deliver over a data bus in a fixed period (sometimes referred to as a peak bandwidth). For some usage models of a memory subsystem that involve different sources of traffic (sometimes referred to as streams) with different levels of priority, the memory subsystem can allow these different sources to compete for the available memory bandwidth based on their respective priorities. In particular, different proportions of the available memory bandwidth are allocated to the memory traffic from each source based on that source's priority. For example, a computing system can manage a set of running processes, including one process involving real-time bank transactions and another process that updates word processing utilities. Assuming that both processes are time-sharing the same processor, which is utilizing a single memory subsystem, it can be desirable for memory requests/commands from the process that is servicing bank transactions to be given priority over the memory requests/commands from the process managing a software update. Namely, the bank transactions have real-time, financial implications, whereas a minor delay updating software is likely of no major concern. However, to restrict processing of memory requests related to the process for updating software entirely while there are pending bank transactions is not a viable solution, as the software update may never be permitted to execute under such a policy. An alternative is to modify a process scheduler in the computing system to prioritize the memory requests of the bank transaction process, but there are some disadvantages to this approach. For example, modification of the process scheduler requires modification of an operating system of the computing system, which is complicated and sometimes not permitted. Also, given the complexity of memory hierarchies in present-day computing systems, decisions made by the operating system regarding memory request scheduling may have only an indirect effect on the ordering of memory request processing once they eventually propagate through a cache hierarchy and reach the memory subsystem.

Aspects of the present disclosure address the above and other deficiencies by implementing a credit-based approach to selecting memory commands for issuance. In particular, a memory subsystem determines bandwidth allocations from a peak bandwidth of the memory subsystem for each stream of memory commands/requests being processed by the memory subsystem. For instance, the bandwidth allocations may represent a percentage or ratio of the peak bandwidth assigned to each stream. Further, these bandwidth allocations are determined based on priorities for each stream of memory requests. For instance, in the example above, a stream of memory requests from a banking process will have a higher priority and consequently a higher bandwidth allocation in comparison to a stream of memory requests from a software update process. Based on the determined bandwidth allocations, the memory subsystem assigns credits to each stream of memory requests from a predetermined number of credits managed by the memory subsystem. For example, the memory subsystem can assign credits to each stream of memory requests proportional to the bandwidth allocated to each stream while ensuring that each stream of memory requests is assigned at least one credit. When determining which memory commands from a command queue to issue for fulfillment, the memory subsystem prioritizes memory commands associated with streams with a higher number of assigned credits. Further, the memory subsystem tracks the number of memory commands issued for each stream of memory requests such that each stream is only allotted issuance of memory commands equal to the originally assigned number of credits until all other streams have reached their credit allocations. Accordingly, the above approach provides a simplified technique for the memory subsystem to manage issuance of memory commands associated with each stream of memory requests being processed by the memory subsystem, which takes into account a priority associated with each stream and does not entirely restrict processing of lower priority streams in favor of higher priority streams. Further details on this approach will be provided herein.

FIG. 1 illustrates an example computing system 100 that includes a memory subsystem 110 in accordance with some embodiments of the present disclosure. The memory subsystem 110 can include media, such as one or more volatile memory devices (e.g., memory device 140), one or more non-volatile memory devices (e.g., memory device 130), or a combination of such.

A memory subsystem 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory subsystems 110. In some embodiments, the host system 120 is coupled to different types of memory subsystems 110. FIG. 1 illustrates one example of a host system 120 coupled to one memory subsystem 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory subsystem 110, for example, to write data to the memory subsystem 110 and read data from the memory subsystem 110.

The host system 120 can be coupled to the memory subsystem 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory subsystem 110. The host system 120 can further utilize an NVM Express (NVMe) interface to access components (e.g., memory devices 130) when the memory subsystem 110 is coupled with the host system 120 by the PCIe interface. The physical host interface can provide an interface for passing control, address, data, and other signals between the memory subsystem 110 and the host system 120. FIG. 1 illustrates a memory subsystem 110 as an example. In general, the host system 120 can access multiple memory subsystems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory devices such as NAND type memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM)

A memory subsystem controller 115 (or controller 115 for simplicity) can communicate with the memory devices 130 to perform operations such as reading data, writing data, or erasing data at the memory devices 130 and other such operations (e.g., in response to commands scheduled on a command bus by controller 115). The memory subsystem controller 115 can include hardware such as one or more integrated circuits and/or discrete components, a buffer memory, or a combination thereof. The hardware can include digital circuitry with dedicated (i.e., hard-coded) logic to perform the operations described herein. The memory subsystem controller 115 can be a microcontroller, special purpose logic circuitry (e.g., a field programmable gate array (FPGA), an application specific integrated circuit (ASIC), etc.), or another suitable processor.

The memory subsystem controller 115 can include a processing device 117 (processor) configured to execute instructions stored in a local memory 119. In the illustrated example, the local memory 119 of the memory subsystem controller 115 includes an embedded memory configured to store instructions for performing various processes, operations, logic flows, and routines that control operation of the memory subsystem 110, including handling communications between the memory subsystem 110 and the host system 120.

In some embodiments, the local memory 119 can include memory registers storing memory pointers, fetched data, etc. The local memory 119 can also include read-only memory (ROM) for storing micro-code. While the example memory subsystem 110 in FIG. 1 has been illustrated as including the memory subsystem controller 115, in another embodiment of the present disclosure, a memory subsystem 110 does not include a memory subsystem controller 115, and can instead rely upon external control (e.g., provided by an external host, or by a processor or controller separate from the memory subsystem 110).

In general, the memory subsystem controller 115 can receive commands or operations from the host system 120 and can convert the commands or operations into instructions or appropriate commands to achieve the desired access to the memory devices 130 and/or the memory device 140. The memory subsystem controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory subsystem controller 115 can further include host interface circuitry to communicate with the host system 120 via the physical host interface. The host interface circuitry can convert the commands received from the host system into command instructions to access the memory devices 130 and/or the memory device 140 as well as convert responses associated with the memory devices 130 and/or the memory device 140 into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the memory subsystem controller 115 and decode the address to access the memory devices 130.

In some embodiments, the memory devices 130 include local media controllers 135 that operate in conjunction with memory subsystem controller 115 to execute operations on one or more memory cells of the memory devices 130. An external controller (e.g., memory subsystem controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory subsystem 110 includes command selection logic 142 that can schedule memory commands for issuance using credits assigned to streams/sources of memory commands. In some embodiments, the controller 115 includes at least a portion of the command selection logic 142. For example, the controller 115 can include a processor 117 (processing device) configured to execute instructions stored in local memory 119 for performing the operations described herein. In some embodiments, command selection logic 142 is part of the host system 110, an application, or an operating system.

The command selection logic 142 can schedule memory commands for issuance using credits assigned to streams/sources of memory commands. Further details with regards to the operations of the command selection logic 142 are described below.

Figure 2B:
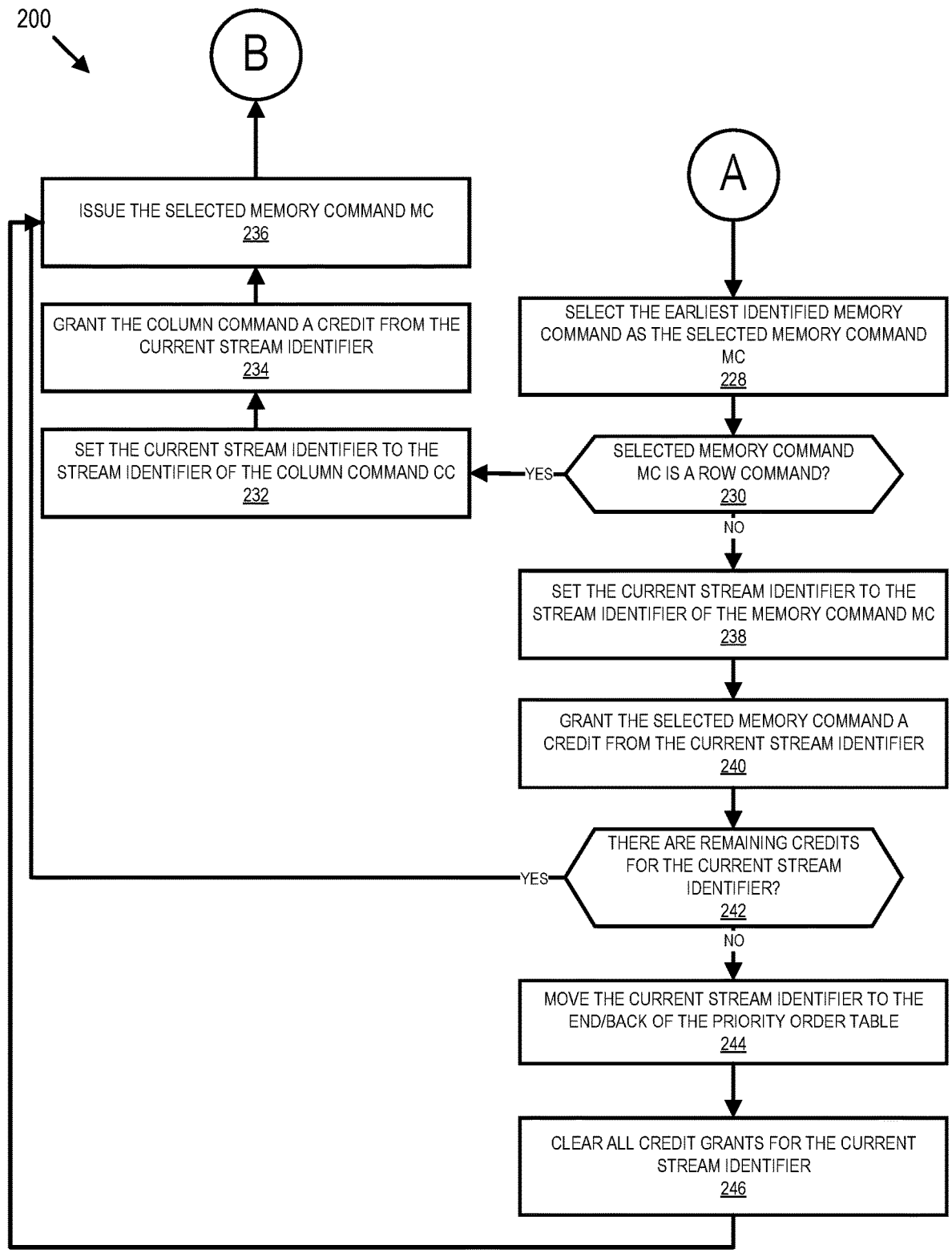

FIGS. 2A and 2B show a flow diagram of an example method 200 to schedule issuance of memory commands based on credits assigned to streams/stream identifiers, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the command selection logic 142 of FIG. 1. Although shown in a particular sequence or order, unless otherwise specified, the order of the processes/operations can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2A, the method 200 commences at operation 202. At operation 202, the processing device assigns a set of bandwidth allocations (e.g., percentages or ratios) to each stream of memory requests/commands being processed by the processing device for a memory device. For example, the memory subsystem 110 may receive memory requests from multiple sources within the host system 120 or from a set of host systems 120 for the memory device 130. For instance, a host system 120 may be managing five processes that each are generating separate sets of memory requests for transmission to the memory subsystem 110. The memory requests can include read requests (e.g., a request to read data from the memory device 130 managed by the memory subsystem 110) or write requests (e.g., a request to write data to the memory device 130). Each set of memory requests from each source can be referred to as a stream of memory requests and can be identified by a stream identifier. The stream identifier can be included in each corresponding memory request or can otherwise be associated with the memory request.

Although described as each stream of memory requests originating from a different source, in some embodiments, a single source can be associated with multiple streams of memory requests. For example, a web browser operating on a host system 120 can be associated with a web browsing stream of memory requests (i.e., memory requests involving retrieving a web page through a web browser) and a delivery stream of memory requests (i.e., memory requests involving streaming a video through the web browser). Since the streams of memory requests are associated with different purposes or activities with different importance/priority, the memory subsystem 110 can treat each stream of memory requests separately.

Although described as the sources of streams of memory requests being outside the memory subsystem 110, in some embodiments, the source of one or more stream of memory requests can be within the memory subsystem 110. For example, the memory subsystem can internally generate memory requests for fill and/or evictions/clean operations. Accordingly, a stream of memory requests can originate within the memory subsystem 110 or outside the memory subsystem 110.

FIG. 3 shows a bandwidth allocation table 300, according to one embodiment. As shown, the bandwidth allocation table 300 includes four entries that correspond to four stream identifiers 302. As noted above, each stream identifier 302 corresponds to a different stream/set of memory requests and can correspond to a different source. For example, the stream identifier 302 with the value "0" can correspond to a banking process that generates or is otherwise associated with memory requests for bank transactions, the stream identifier 302 with the value "1" can correspond to a game process that generates or is otherwise associated with memory requests for a turn-based game, the stream identifier 302 with the value "2" can correspond to a streaming video process that generates or is otherwise associated with memory requests for a video stream, and the stream identifier 302 with the value "3" can correspond to a web browser process that generates or is otherwise associated with memory requests for loading a webpage. Each of these processes and corresponding streams of memory requests can be associated with different priority levels. For example, the banking process can be associated with a highest priority level while the streaming video process, the game process, and the web browser process are associated with successive lower levels of priority such that the web browser has the lowest level priority. In some embodiments, two or more processes and corresponding streams of memory requests can have identical priority levels.

Based on the associated priority levels, the memory subsystem 110 assigns a bandwidth allocation percentage or ratio to each process and corresponding stream of memory requests. These bandwidth allocations 304 represent a portion of the peak bandwidth of the memory subsystem 110 and/or a memory device managed by the memory subsystem 110 (e.g., the memory device 130). For example, FIG. 3 shows bandwidth allocations 304 for each stream identifier 302. Each bandwidth allocation 304 indicates the portion of available bandwidth of the memory subsystem 110 reserved for memory requests associated with a given stream identifier 302 when all streams are competing for the available bandwidth. As shown in FIG. 3, the stream identifier 302 with the value "0" is assigned a bandwidth allocation 304 of 50%, the stream identifier 302 with the value "1" is assigned a bandwidth allocation 304 of 10%, the stream identifier 302 with the value "2" is assigned a bandwidth allocation 304 of 35%, and the stream identifier 302 with the value "3" is assigned a bandwidth allocation 304 of 5%. The streams and bandwidth allocations represented in FIG. 3 are examples and other options or possible. However, the bandwidth allocation table 300 will be used hereinafter for purposes of explaining the method 200.

At operation 204, the processing device assigns credits to each stream of memory requests based on the set of bandwidth allocations 304. For instance, the memory subsystem 110 can assign credits to each stream identifier 302 of the bandwidth allocation table 300 according to the determined bandwidth allocation 304. For example, the memory subsystem 110 can maintain a predetermined number of credits that can be allocated/assigned to streams/stream identifiers 302 and the predetermined number of credits can be associated with the peak bandwidth of the memory subsystem 110 and/or a memory device managed by the memory subsystem 110. For example, each credit can represent 1%, 5%, etc. of the peak bandwidth.

The predetermined number of credits are assigned to streams/stream identifiers 302 according the bandwidth allocations 304 determined at operation 202 (i.e., the limited number of credits are assigned in proportion to the bandwidth allocations). For example, the memory subsystem 110 can maintain ten credits (i.e., the predetermined number of credits is ten credits). As shown in FIG. 4, using the bandwidth allocation table 300 shown in FIG. 3, the stream identifier 302 with the value "0" is assigned five credits 402 (corresponding to the 50% bandwidth allocation 304), the stream identifier 302 with the value "1" is assigned one credit 402 (corresponding to the 10% bandwidth allocation 304), the stream identifier 302 with the value "2" is assigned three credits 402 (corresponding to the 35% bandwidth allocation 304), and the stream identifier 302 with the value "3" is assigned one credit 402 (corresponding to the 5% bandwidth allocation 304). Namely, the memory subsystem 110 assigns credits 402 to each stream/stream identifier 302 up to the predetermined number of available credits 402 (e.g., ten credits 402 in the example of FIG. 4) and according to their bandwidth allocation 304, while ensuring that each stream/stream identifier 302 is assigned at least one credit 402 as shown in the credit table 400 of FIG. 4. The streams/stream identifiers 302 and credits 402 represented in FIG. 4 are examples and other options are possible. However, the credit table 400 will be used hereinafter for purposes of explaining the method 200.

At operation 206, the processing device sorts stream identifiers 302 in the credit table 400 in the order of most to least assigned credits 402 to form a priority order table. Accordingly, following the sort, a first/top stream identifier 302 in the priority order table has the most credits 402 or is tied for the most credits 402 in the priority order table. For example, FIG. 5 shows a priority order table 500 based on the credit 402 assignment of FIG. 4 following the memory subsystem 110 performing a sort at operation 206. As shown, the stream identifier 302 with the value of "0" is the first/top stream identifier 302.

As described above, the memory subsystem receives memory requests from a host system 120 or are otherwise generated by the memory subsystem 110 (e.g., internally generated memory requests for fill and/or evictions/clean operations). Each of these memory requests can be associated with a stream identifier 302. The memory subsystem 110 (e.g., the frontend of the memory subsystem 110) generates one or more column commands for each of these memory requests and possibly row commands that correspond to locations in a memory device (e.g., memory banks of the memory device 130). In particular, a combination of row and column is used to identify a specific location in a memory device. The column command to access data in a row is generated based on the memory request and a row command is generated if the corresponding row is not yet opened/activated. Since the memory subsystem 110 can only issue a limited number of memory commands per time period (i.e., the memory device 130 and/or the memory subsystem 110 has a limited peak bandwidth), the memory subsystem 110 selectively determines which memory commands to issue to maintain the priority levels and bandwidth allocations 304. In particular, as mentioned above, each stream/stream identifier 302 is assigned a number of credits 402 according to a corresponding bandwidth allocation 304. The memory subsystem 110 selects commands for issuance at least partly based on these credits 402 assigned to streams/stream identifiers 302. In particular, the processing device is more likely to select a column command associated with a stream identifier 302 that has a higher number of credits 402 than a column command associated with a stream identifier 302 that has a comparatively lower number of credits 402. For example, the stream identifier 302 with the value "0" shown in FIG. 5 has the most assigned credits 402 in this example and therefore, the memory subsystem 110 is more likely to issue an associated column command than a column command associated with any other stream identifier 302.

At operation 208, the processing device selects the first/top stream identifier 302 in the priority order table 500 (i.e., the stream identifier 302 that is associated with the most credits 402) as the current stream identifier 302. For instance, in the example priority order table 500 shown in FIG. 5, the processing device would select the stream identifier 302 with the value "0" as the current stream identifier 302 at operation 208.

At operation 210, the processing device determines if any rows in any memory banks of the memory device 130 need to be closed based on a page/row policy of the memory subsystem 110. For example, the memory subsystem 110 can use a closed page policy or an open page policy in determining when to close rows in a memory bank. In particular, the memory subsystem 110 can maintain a command queue that stores memory commands, including column commands and row commands, while these memory commands await issuance/fulfillment. A row command activates/opens a corresponding row and a column command access data in an open row. Accordingly, a row command is sometimes needed prior to issuance of a column command when the row, which the column command is attempting to access, is not yet open. With a closed page policy, a row is closed (i.e., a precharge operation is performed on the row to close the row) when no pending column commands in the memory subsystem 110 (i.e., in the command queue) are associated with the row. With an open page policy, a row is closed when the row has been open for a threshold period of time. For example, a precharge operation is performed on a row in a memory bank of a memory device when the row has been open for a threshold period of time (e.g., 5 microseconds) following the issuance of the last column command associated with the row. In this example, waiting the threshold time period following the issuance of a last pending column command associated with the row allows the possibility that other column commands could be generated for the row before the row is closed. Namely, activating a row is a relatively lengthy process and closing the row may be premature when there is an immediate need to reopen the row in response to a new column command associated with the row. However, despite the cost, closing rows in a memory bank allows other rows to be opened in the memory bank when needed. Namely, a memory bank can only allow a single row to be open at any given time. Accordingly, closing a row allows the memory bank to permit the opening of another row when needed.

In some embodiments, the processing device can determine that a row needs to be closed based on a refresh policy in addition to or instead of a page policy. In particular, the memory subsystem 110 can be operating on volatile memory devices, such as DRAM devices (e.g., the memory device 140). These types of memory devices are capacitor based, which discharge over time. To ensure that data stored in these memory devices is retained, a refresh operation is performed to rewrite the data, which resets the charge level of associated capacitors. However, to perform a refresh operation requires all rows in an associated bank to be closed. Accordingly, the processing device can determine to close a set of rows at operation 210 per a refresh policy in addition to potentially other factors.

Upon the processing device determining at operation 210 that a row needs to be closed, the method 200 moves to operation 212. At operation 212, the processing device generates and issues a precharge command for the row that is to be closed. Following operation 212, the method 200 moves to operation 214.

At operation 214, the processing device waits for (1) the next scheduling cycle (i.e., the next period of time (e.g., a clock period of the memory subsystem 110) that the processing device can issue a command), (2) another row that needs to be closed or refreshed, or (3) when there are no pending commands, another command to issue. Following operation 214, the method 200 returns to operation 208.

Returning to operation 210, upon the processing device determining that no row needs to be closed, the method 200 moves to operation 216. At operation 216, the processing device determines if a memory bank needs a refresh operation to be performed. In particular, as noted above, the memory device managed by the memory subsystem 110 can be volatile memory that discharge over time. The discharge time of each type of volatile memory is different such that a first type of volatile memory can have a first discharge time period, after which a refresh operation needs to be performed to ensure data stored in the memory device is retained, while a second type of volatile memory can have a second discharge time period, which can be different from the first discharge time period. The memory subsystem 110 can determine that a refresh operation needs to be performed upon the elapse of a discharge time period associated with a row. Although described in relation to a refresh of a row, in some embodiments, refresh operations are performed in relation to an entire memory bank (e.g., a set of rows), two or more memory banks (e.g., multiple sets of rows), a memory rank (e.g., a set of memory banks), or two or more memory ranks (e.g., multiple sets of memory banks). Upon the processing device determining that a refresh operation is needed for a row, the method 200 moves to operation 218.

At operation 218, the processing device generates and issues a refresh command such that a refresh operation can be performed. As noted above, the refresh can be for a row, a memory bank, or a memory rank. Following operation 218, the method 200 moves to operation 214.

Returning to operation 216, upon the processing device determining that a refresh operation is not needed for a row, the method 200 moves to operation 220. At operation 220, the processing device determines whether (1) there are any pending memory commands for the current stream identifier 302 and (2) there are any remaining credits 402 for the current stream identifier 302. In particular, the processing device can check the priority order table 500 to determine a number of credits 402 associated with the current stream identifier 302 and a command queue to determine if there are any pending commands associated with the current stream identifier 302. FIG. 6 shows a command queue 600, according to one embodiment. As shown, the command queue 600 includes memory commands 602 and associated stream identifiers 302. Accordingly, the memory subsystem 110 can examine the command queue 600 to determine whether there are any pending memory commands 602 for the current stream identifier 302. In response to determining that there are either no pending memory commands 602 for the current stream identifier 302 or there are not any remaining credits 402 for the current stream identifier 302, the method 200 moves to operation 222.

At operation 222, the processing device selects the next stream identifier 302 in the priority order table 500 as the current stream identifier 302. Namely, since there are no pending memory commands 602 for the current stream identifier 302 and/or there are no credits 402 to use for the current stream identifier 302, the method 200 moves to the next highest priority stream identifier 302. Following operation 222, the method 200 returns to operation 220.

Returning to operation 220, upon the processing device determining that there are pending memory commands 602 for the current stream identifier 302 and there are remaining credits 402 for the current stream identifier 302, the method 200 moves to operation 224. At operation 224, the processing device determines whether a pending memory command 602 associated with the current stream identifier 302 is the oldest column command for a row in a memory device managed by the processing device. In particular, to enforce proper command dependencies (e.g., to ensure writes are performed prior to subsequent reads), the memory subsystem 110 processes memory commands 602 in order of their age (i.e., older memory commands 602 are processed before younger memory commands 602 on each row). Although the memory subsystem 110 could enforce memory command 602 dependencies at a more granular level (e.g., memory commands 602 are processed according to their age relative to a combination of row and column), enforcing memory command 602 dependencies per row can simplify implementation. In response to the processing device determining that the current stream identifier 302 is not associated with a column command that is the oldest column command for a row, the method 200 moves to operation 222. Conversely, in response to the processing device determining that the current stream identifier 302 is associated with a column command that is the oldest command for a row, the method 200 moves to operation 226.

At operation 226, the processing device determines whether a pending memory command 602 can be identified in the command queue 600 that (1) is a pending column command that a) has already been granted a credit (as will be described below) or b) is associated with the current stream identifier 302 or (2) is a pending row command corresponding to a row in which the current stream identifier 302 has a pending column command (referred to as column command CC) that is the oldest column command for that row. As noted above, the memory subsystem 110 may generate row commands to open/activate rows in anticipation for a pending column command that seeks to access data from that row. Since activating a row via a row command requires a relatively long amount of time to complete, the memory subsystem 110 activates rows in anticipation of issuance of a corresponding column command but issues the credit to the soon-to-be-issued column command. When the processing device cannot identify a memory command 602 as outlined above, the method 200 moves to operation 214.

Conversely, when the processing device can identify a memory command 602 as outlined above, the method 200 moves to operation 228. At operation 228, the processing device selects the earliest identified memory command 602 as outlined in operation 226 (either a column command or a row command) as the selected memory command 602 (referred to as the memory command (MC)). For example, using the command queue 600 of FIG. 6 in which memory commands 602 are numbered according to their decreasing age (e.g., memory command 0 is the oldest memory command 602 and the memory command 3 is the youngest memory command 602), when the memory command 0 is a pending column command that is associated with the current stream identifier 302 and the memory command 3 is a pending row command corresponding to a row in which the current stream identifier 302 has a pending column command CC that is the oldest column command for that row, the memory subsystem 110 selects the memory command 0 as the selected memory command MC.

At operation 230, the processing device determines whether the selected memory command MC is a row command. When the processing device determines that the selected memory command MC is a row command, the method 200 moves to operation 232.

At operation 232, the processing device sets the current stream identifier 302 to the stream identifier 302 for the column command CC, which was identified at operation 226. For example, when at operation 228 the memory subsystem 110 selects the memory command 0, which is a row command to a row for which the column command 3 is attempting to access, the memory subsystem 110 sets the current stream identifier 302 to "0", which corresponds to the stream identifier 302 for memory command 3.

Figure 7:
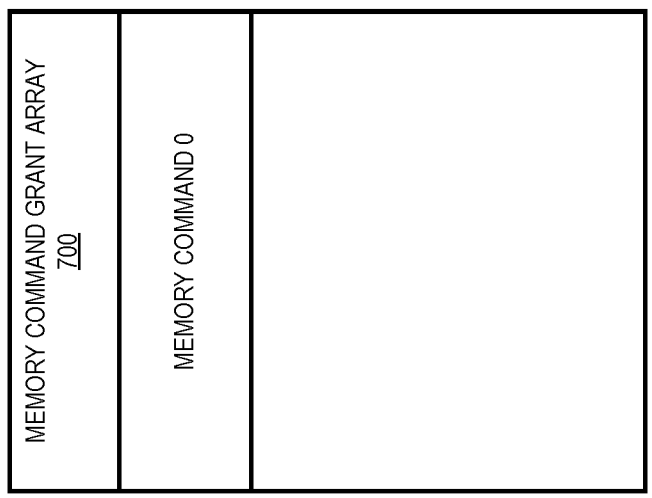
FIG. 7 shows a memory command grant array for storing memory commands associated with a stream/stream identifier that have been granted a credit, in accordance with some embodiments of the present disclosure.

At operation 234, the processing device grants the memory command MC a credit 402 from the set of credits 402 allocated to the current stream identifier 302 such that the memory command MC is permitted to issue. For example, granting of a credit 402 from the set of credits 402 allocated to the current stream identifier 302 to the memory command MC can include adding the memory command MC to an array of memory commands 602 associated with the current stream identifier 302. For instance, FIG. 7 shows a memory command grant array 700 associated with the stream identifier 302 with the value "0". As shown, the array 700 includes the memory command 0, which was added at operation 234. Since the array 700 includes a single memory command 602, only a single credit, from the five credits 402 allocated to the stream/stream identifier 302, has been used.

At operation 236, the processing device issues the memory command MC. For example, the memory subsystem 110 can issue the memory command MC. Issuing the memory command can include (1) reading from or writing data to a portion of a memory device when the memory command is a column command) or (2) activating a row when memory command MC is a row command.

Returning to operation 230, when the selected memory command MC is not a row command (e.g., the selected memory command is a column command), the method 200 moves to operation 238. At operation 238, the processing device sets the current stream identifier 302 to the stream identifier 302 for the memory command MC, which was identified at operation 226. For example, when at operation 228 the memory subsystem 110 selects the memory command 0, which is a column command, the memory subsystem 110 sets the current stream identifier 302 to "0", which corresponds to the stream identifier 302 for memory command 0.

At operation 240, the processing device grants the memory command MC a credit 402 from the set of credits 402 allocated to the current stream identifier 302 such that the memory command MC is permitted to issue. Operation 240 can be performed in a similar fashion as operation 234.

At operation 242, the processing device determines whether the current stream identifier 302 has remaining credits 402. For example, when using a memory command grant array 700 to track credits 402 granted to memory commands 602 for each stream identifier 302, the memory subsystem 110 can determine if the current stream identifier 302 has remaining credits 402 by comparing the number of entries in a memory command grant array 700 associated with the current stream identifier 302 (i.e., a size of the memory command grant array 700) with an original number of credits 402 allocated to the current stream identifier 302. When the number of entries in a memory command grant array 700 associated with the current stream identifier 302 is equal to the number of credits 402 allocated to the current stream identifier 302, the processing device determines that the current stream identifier does not have credits 402 remaining and the method 200 moves to operation 244.

At operation 244, the processing device moves the current stream identifier 302 to the end/back of the priority order table 400. In particular, since the current stream identifier 302 has not more credits 402 for granting memory commands 602, the stream identifier 302 is moved to last priority in the priority order table 400.

At operation 246, the processing device clears all credit 402 grants associated with the current stream identifier 302. For example, when using a memory command grant array 700 to track credits 402 granted to memory commands 602, the memory subsystem 110 can clear credit 402 grants by clearing/emptying the memory command grant array 700 associated with the current stream identifier 302 (e.g., removing all entries in the memory command grant array 700 such that the memory command grant array 700 is empty).

Following operation 246 or upon the processing device determining at operation 242 that the current stream identifier 302 has remaining credits 402, the method 200 moves to operation 236.

Figure 8:
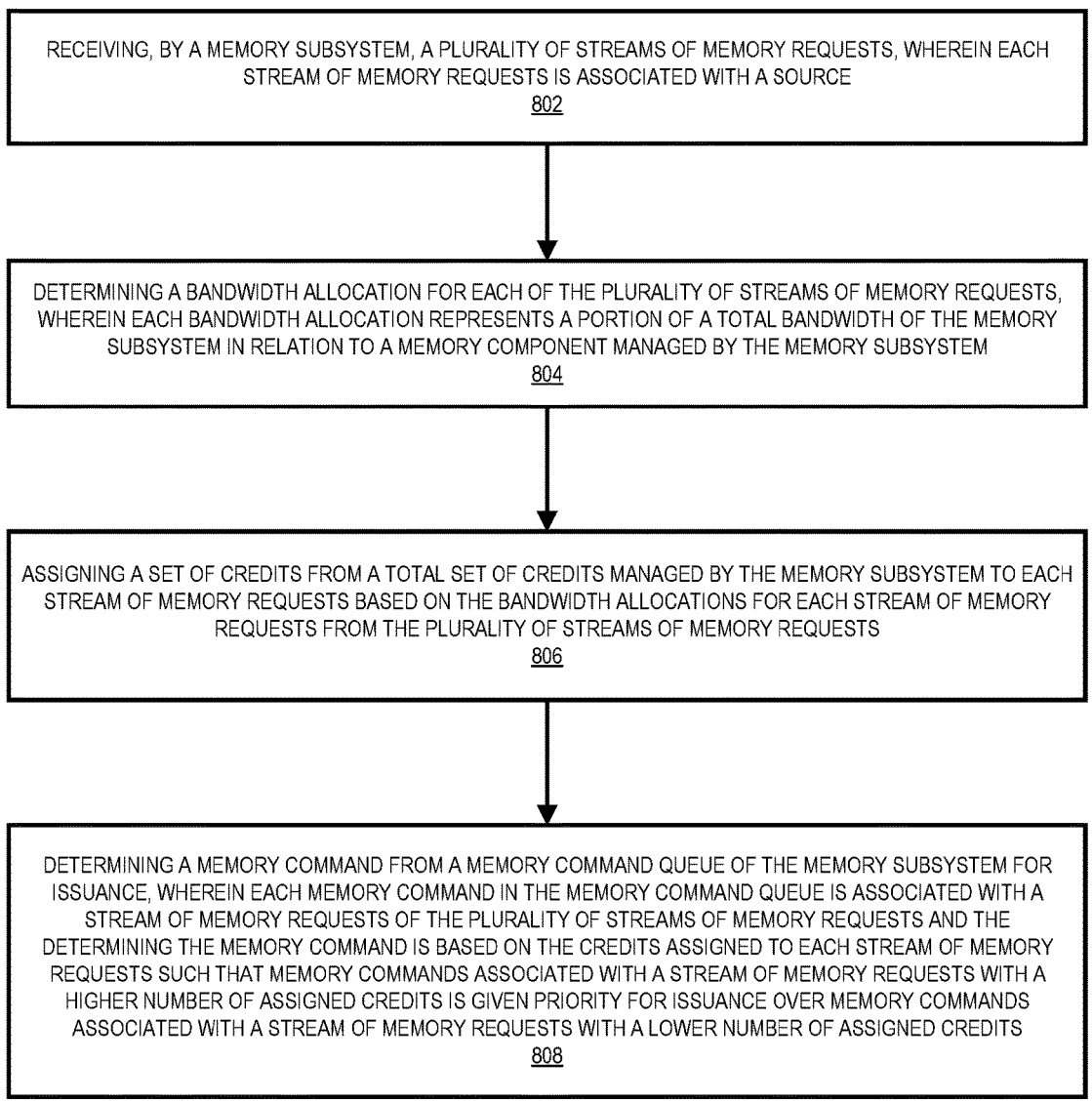
FIG. 8 is a flow diagram of another example method to schedule issuance of memory commands based on credits assigned to streams of memory requests, in accordance with some embodiments of the present disclosure.

Turning now to FIG. 8, a flow diagram is shown for an example method 800 to schedule issuance of memory commands based on credits assigned to streams/stream identifiers, in accordance with some embodiments of the present disclosure. The method 800 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 800 is performed by the command selection logic 142 of FIG. 1. Although shown in a particular sequence or order, unless otherwise specified, the order of the processes/operations can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 8, the method 800 commences at operation 802. At operation 802, the processing device receives a plurality of streams of memory requests and each stream of memory requests is associated with a source. For example, as described above, the memory subsystem 110 may receive memory requests from multiple sources within the host system 120 or from a set of host systems 120 for the memory device 130. For instance, a host system 120 may be managing five processes that each are generating separate sets of memory requests for transmission to the memory subsystem 110 and each set of memory requests from each source can be referred to as a stream of memory requests and can be identified by a stream identifier.

At operation 804 the processing device determines a bandwidth allocation 304 for each of the plurality of streams of memory requests. In this configuration, each bandwidth allocation 304 represents a portion of a total bandwidth of the memory subsystem 110 in relation to a memory component managed by the memory subsystem 110 and each bandwidth allocation 304 indicates a priority level of a corresponding stream of memory requests relative to other streams of memory requests in the plurality of streams of memory requests based on a corresponding source of each stream of memory requests. For example, the bandwidth allocation table 300 includes four entries that correspond to four stream identifiers 302 and four corresponding streams of memory requests. As noted above, each stream identifier 302 corresponds to a different stream/set of memory requests and can correspond to a different source. Since the stream identifier 302 with the value "0" has the largest allocation, the corresponding stream has the highest priority on the other streams/stream identifiers 302.

At operation 806, the processing device assigns a set of credits 402 from a total set of credits 402 managed by the memory subsystem 110 to each stream of memory requests based on the bandwidth allocations 304 for each stream of memory requests from the plurality of streams of memory requests. Namely, the memory subsystem 110 assigns credits 402 to each stream/stream identifier 302 up to the predetermined number of available credits 402 (e.g., ten credits 402 in the example of FIG. 4) and according to their bandwidth allocation 304, while ensuring that each stream/stream identifier 302 is assigned at least one credit 402 as shown in the credit table 400 of FIG. 4.

At operation 808, the processing device determines a memory command from a memory command queue 700 of the memory subsystem 110 for issuance. In this configuration, each memory command in the memory command queue 700 is associated with a stream of memory requests of the plurality of streams of memory requests and the determining the memory command is based on the credits 402 assigned to each stream of memory requests such that memory commands associated with a stream of memory requests with a higher number of assigned credits is given priority for issuance over memory commands associated with a stream of memory requests with a lower number of assigned credits 402.

Figure 9:
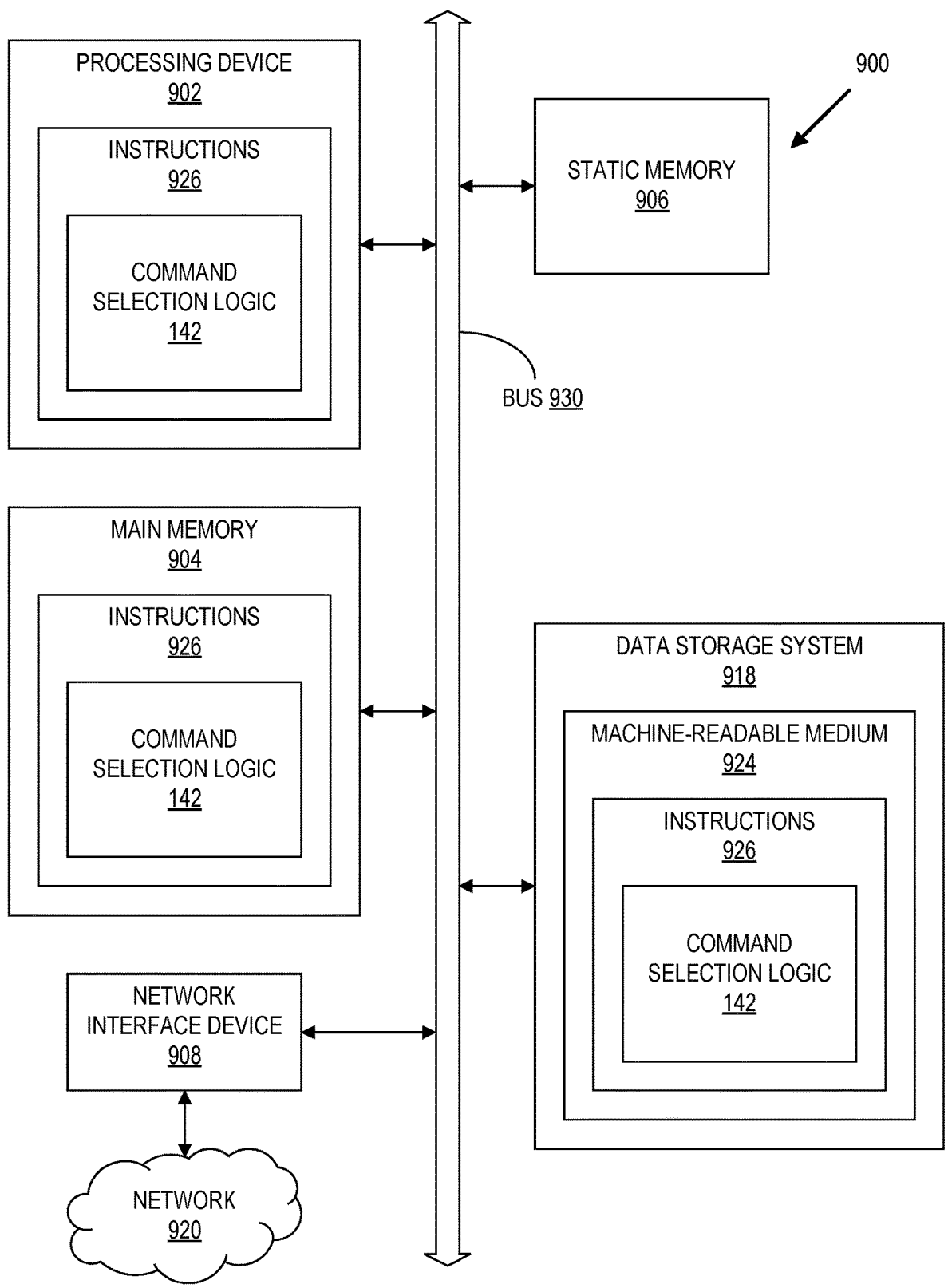
FIG. 9 is a block diagram of an example computer system in which embodiments of the present disclosure may operate.

FIG. 9 illustrates an example machine of a computer system 900 within which a set of instructions, for causing the machine to perform any one or more of the methodologies discussed herein, can be executed. In some embodiments, the computer system 900 can correspond to a host system (e.g., the host system 120 of FIG. 1) that includes, is coupled to, or utilizes a memory subsystem (e.g., the memory subsystem 110 of FIG. 1) or can be used to perform the operations of a controller (e.g., to execute an operating system to perform operations corresponding to the command selection logic 142 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage system 918, which communicate with each other via a bus 930.

Processing device 902 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 can also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein. The computer system 900 can further include a network interface device 908 to communicate over the network 920.

The data storage system 918 can include a machine-readable storage medium 924 (also known as a computer-readable medium) on which is stored one or more sets of instructions 926 or software embodying any one or more of the methodologies or functions described herein. The instructions 926 can also reside, completely or at least partially, within the main memory 904 and/or within the processing device 902 during execution thereof by the computer system 900, the main memory 904 and the processing device 902 also constituting machine-readable storage media. The machine-readable storage medium 924, data storage system 918, and/or main memory 904 can correspond to the memory subsystem 110 of FIG. 1.

In one embodiment, the instructions 926 include instructions to implement functionality corresponding to command selection logic (e.g., the command selection logic 142 of FIG. 1). While the machine-readable storage medium 924 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods 200 and 800 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving, by a memory subsystem, a plurality of streams, wherein each stream is a stream of memory requests associated with a source and a memory component managed by the memory subsystem;
determining a bandwidth allocation for each of the plurality of streams, wherein each bandwidth allocation represents a portion of a total bandwidth of the memory subsystem in relation to the associated memory component;
assigning a set of credits from a total set of credits managed by the memory subsystem to each stream using the bandwidth allocations for each stream; and
determining a memory command from a memory command queue of the memory subsystem for issuance, wherein each memory command in the memory command queue is associated with a stream of the plurality of streams and wherein determining the memory command for issuance comprises:
selecting a stream from the plurality of streams with a highest number of assigned credits;
determining, in response to determining that there is a pending memory command associated with the selected stream that is an oldest memory command for a row in the associated memory component, one or more memory commands in the memory command queue that (1) have either already been granted a credit or are associated with the selected stream of memory requests or (2) correspond to a row in the memory component in which a column command, which is an oldest column command for the row, is associated with a stream of memory requests that has credits available; and
selecting an earliest memory command from the one or more memory commands.

2. The method of claim 1, wherein each source of the plurality of streams is an application on a host system.

3. The method of claim 1, further comprising:
allocating a credit for the memory command from the credits assigned to the stream associated with the memory command; and
issuing the memory command to fulfill a corresponding memory request.

4. The method of claim 1, wherein determining the memory command for issuance further comprises:
selecting a next stream from the plurality of streams of with a next highest number of assigned credits in response to determining that there are no memory commands for the selected stream in the memory command queue.

5. The method of claim 4, wherein determining the memory command for issuance further comprises:
selecting the next stream from the plurality of streams with the next highest number of assigned credits in response to determining that no pending memory command in the memory command queue that is associated with the selected stream is the oldest memory command for a row in the associated memory component.

6. The method of claim 1, wherein determining the memory command for issuance further comprises:
determining whether the selected earliest memory command is a row command;
setting, in response to determining that the selected earliest memory command is a row command, a stream associated with the column command as the selected stream; and
granting the column command a credit from the credits assigned to the selected stream,
wherein the selected earliest memory command is the memory command determined for issuance and the method further comprises issuing the selected earliest memory command to fulfill a corresponding memory request.

7. The method of claim 6, wherein determining the memory command for issuance further comprises:
setting, in response to determining that the selected memory command is not a row command, a stream associated with the selected memory command as the selected stream; and
granting the selected memory command a credit from the credits assigned to the selected stream,
wherein the method further comprises issuing the selected memory command to fulfill a corresponding memory request.

8. The method of claim 1, wherein selecting the next stream is in response to determining there are no remaining credits for the selected stream of memory requests.

9. A non-transitory computer-readable storage medium comprising instructions that, when executed by a processing device, cause the processing device to:
receive a plurality of streams, wherein each stream is a stream of memory requests associated with a source and a memory component managed by a memory subsystem;
determine a bandwidth allocation for each of the plurality of streams, wherein each bandwidth allocation represents a portion of a total bandwidth of a memory subsystem in relation to the associated memory component;
assign a set of credits from a total set of credits managed by the memory subsystem to each stream using the bandwidth allocations for each stream; and
determine a memory command from a memory command queue of the memory subsystem for issuance, wherein each memory command in the memory command queue is associated with a stream of the plurality of streams and wherein determining the memory command for issuance comprises:
selecting a stream from the plurality of streams with a highest number of assigned credits;
determining, in response to determining that there is a pending memory command associated with the selected stream that is an oldest memory command for a row in the associated memory component, one or more memory commands in the memory command queue that (1) have either already been granted a credit or are associated with the selected stream of memory requests or (2) correspond to a row in the memory component in which a column command, which is an oldest column command for the row, is associated with a stream of memory requests that has credits available; and selecting an earliest memory command from the one or more memory commands.

10. The non-transitory computer-readable medium of claim 9, wherein each source of the plurality of streams is an application on a host system.

11. The non-transitory computer-readable medium of claim 9, wherein the processing device is further to:

allocate a credit for the memory command from the credits assigned to the stream associated with the memory command; and issue the memory command to fulfill a corresponding memory request.

12. The non-transitory computer-readable medium of claim 9, wherein determining the memory command for issuance further comprises:

selecting a next stream from the plurality of streams with a next highest number of assigned credits in response to determining that there are no memory commands for the selected stream of memory requests in the memory command queue.

13. The non-transitory computer-readable medium of claim 12, wherein determining the memory command for issuance further comprises:

selecting the next stream from the plurality of streams of with the next highest number of assigned credits in response to determining that no pending memory command in the memory command queue that is associated with the selected stream is the oldest memory command for a row in the associated memory component.

14. The non-transitory computer-readable medium of claim 9, wherein determining the memory command for issuance further comprises:

determining whether the selected memory command is a row command;

setting, in response to determining that the selected memory command is a row command, a stream associated with the column command as the selected stream; and granting the column command a credit from the credits assigned to the selected stream, wherein the selected memory command is the memory command and the processing device is further to issue the selected memory command to fulfill a corresponding memory request.

15. The non-transitory computer-readable medium of claim 14, wherein determining the memory command for issuance further comprises:

setting, in response to determining that the selected memory command is not a row command, a stream associated with the selected memory command as the selected stream; and granting the selected memory command a credit from the credits assigned to the selected stream, wherein the processing device is further to issue the selected memory command to fulfill a corresponding memory request.

16. The non-transitory computer-readable medium of claim 9, wherein selecting the next stream is in response to determining there are no remaining credits for the selected stream of memory requests.

17. A system comprising:

a memory component; and a processing device, operatively coupled with the memory component, to:

assign a set of credits from a total set of credits managed by a memory subsystem to each of a plurality of streams using bandwidth allocations for each stream, wherein each stream is a stream of memory requests associated with a source and the memory component managed by the memory subsystem, and wherein each bandwidth allocation represents a portion of a total bandwidth of the memory subsystem in relation to the associated memory component; and determine a memory command from a memory command queue of the memory subsystem for issuance, wherein each memory command in the memory command queue is associated with a stream of the plurality of streams and wherein determining the memory command for issuance comprises:

selecting a stream from the plurality of streams with a highest number of assigned credits;

determining, in response to determining that there is a pending memory command associated with the selected stream that is an oldest memory command for a row in the associated memory component, one or more memory commands in the memory command queue that (1) have either already been granted a credit or are associated with the selected stream of memory requests or (2) correspond to a row in the memory component in which a column command, which is an oldest column command for the row, is associated with a stream of memory requests that has credits available; and selecting an earliest memory command from the one or more memory commands.

18. The system of claim 17, wherein determining the memory command for issuance comprises:

selecting a next stream from the plurality of streams with a next highest number of assigned credits in response to determining that there are no memory commands for the selected stream of memory requests in the memory command queue;

and selecting the next stream of memory requests from the plurality of streams of memory requests with the next highest number of assigned credits in response to determining that no pending memory command in the memory command queue that is associated with the selected stream of memory requests is the oldest memory command for a row in the memory component.

19. The system of claim 18, wherein determining the memory command for issuance further comprises:

determining whether the selected memory command is a row command;

setting, in response to determining that the selected memory command is a row command, a stream associated with the column command as the selected stream; and granting the column command a credit from the credits assigned to the selected stream, wherein the selected memory command is the memory command determined for issuance and the processing device is further to issue the selected memory command to fulfill a corresponding memory request.

20. The system of claim 19, wherein determining the memory command for issuance further comprises:

setting, in response to determining that the selected memory command is not a row command, a stream associated with the selected memory command as the selected stream; and granting the selected memory command a credit from the credits assigned to the selected stream, wherein the processing device is further to issuing the selected memory command to fulfill a corresponding memory request.

* * * * *